April 17, 1928.
M. HEGERLAND
HAY LOADING DEVICE
Filed Feb. 16, 1923
1,666,092
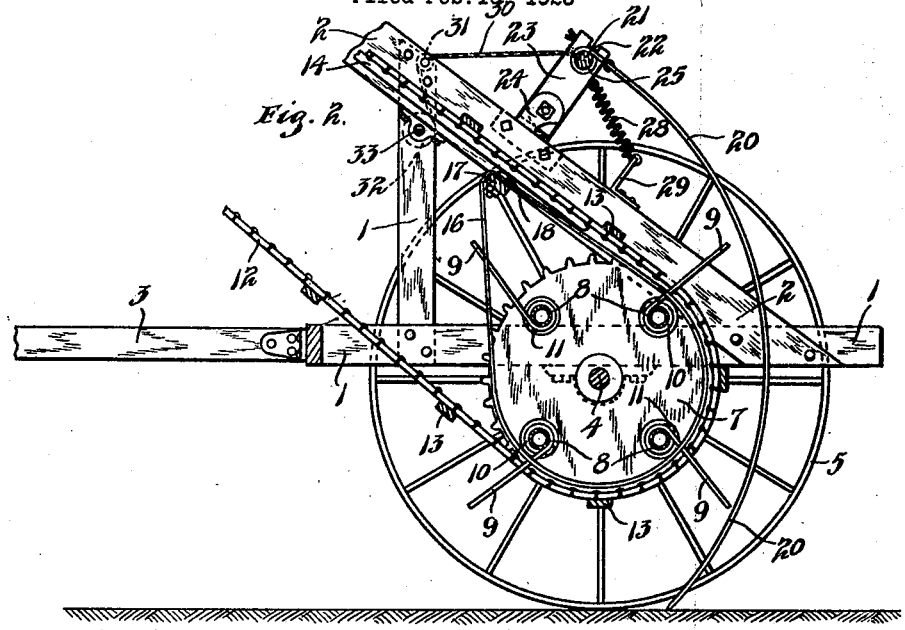
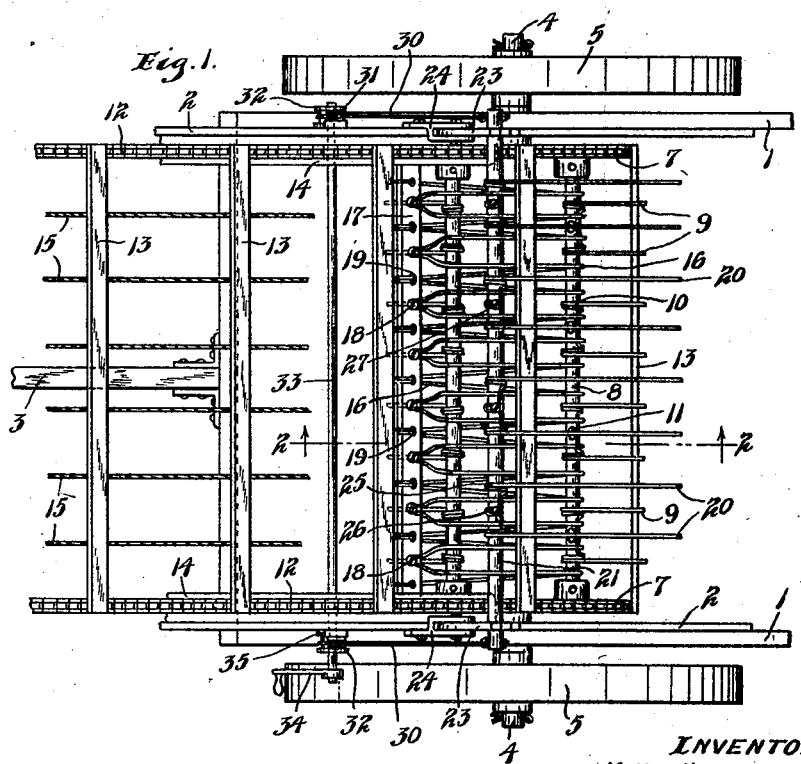
INVENTOR.
MIKE HEGERLAND.
BY HIS ATTORNEY.
James F. Williamson Patented Apr. 17, 1928.

1,666,092

UNITED STATES PATENT OFFICE.

MIKE HEGERLAND, OF WOODVILLE, WISCONSIN.

HAY-LOADING DEVICE.

Application filed February 16, 1923. Serial No. 619,374.

This invention relates to a device for harvesting hay or similar material and particularly to a device adapted for gathering the mown hay and loading the same. Such hay loaders which place the hay upon the wagon removing the same from the field are now commonly used and such loaders are provided with means for gathering or accumulating the hay as it lies upon the field. With the gathering devices of the prior art, however, if the machine travels over recesses or hollows in the ground, the hay therein is often missed as the gathering device does not reach into such recesses and if a portion of the gathering device passes over a hump on the ground the entire device is lifted so that hay is also missed. It often happens also that in passing over gulleys the hay loader will miss hay lying therein.

It is an object of this invention, therefore, to provide a simple and efficient structure of hay loader which will gather all of the hay as it is drawn along the ground.

It is a further object of the invention to provide a device such as described having a gathering device comprising independently swinging rake teeth of considerable length which are disposed at the rear of the machine and swing into engagement with the ground.

It is still another object of the invention to provide a novel form of reel which is adapted to deliver hay to an elevator on the machine and to provide a novel stripping means for such reel.

It is a still further object of the invention to provide a novel mounting for the rake members above mentioned which can be moved to raise the same from contact with the ground when the machine is being transported and not in use.

These and other objects and advantages of the invention will be fully set forth in the following description made in connection with the accompanying drawings in which like reference characters refer to the same parts throughout the different views, and in which, Fig. 1 is a top plan view of that portion of the hay loader embodying applicant's invention;

Fig. 2 is a vertical section taken on the line 2—2 of Fig. 1, as indicated by the arrows.

Such hay loaders as contemplated in the present invention are provided with transportable wheeled frames on which an elevator is mounted to which the gathered hay is transferred and by which it is carried to the top of the load.

Referring to the drawings, the frame of such a machine is designated generally as 1, which comprises upwardly inclined members 2. The frame 1 is provided with some suitable draft means or tongue 3 by which the machine is drawn across the field. Suitably mounted in the frame is a transverse axle 4, to the ends of which are secured the wheels 5 which support the frame and parts thereon, said wheels being illustrated as being retained on said axle by suitable cotter pins and being disposed at the outer sides of the frame. A reel is mounted on the axle to be turned thereby comprising end members 7 between which extend a plurality of rods 8 equally spaced circumferentially about the disks which, in the embodiment of the invention illustrated are shown as four in number. While these rods may be made of any suitable form or material, they are illustrated as being formed of pipe and in practice a one-inch pipe has been found to be a convenient size. The rods 8 carry and have secured thereto a plurality of projecting prongs or teeth 9. These teeth are preferably made by forming spaced coils 10 in a heavy wire or rod, which coils are connected by a portion at the center of said wire or rod formed into an eye through which a bolt or rivet 11 passes to secure the same to the rods 8, it being understood that the coils 10 are disposed on and about the rods 8. Each wire or rod thus forms two of the prongs 9, which prongs are equally spaced along the rods 8 and the reel thus comprises a plurality of rows of such prongs or teeth. The disk members 7 have teeth formed on their peripheries to constitute sprocket wheels and a pair of chains 12 extend about said sprocket wheels, which chains carry conveyor slats 13. The upper run of the chains 12 passes along adjacent bars 14 extending longitudinally of the upwardly inclined members 2, on which bars the conveyor slats 13 rest. There are usually a plurality of spaced bars extending upwardly between and parallel to the members 2 and the slats 13 are also further connected by flexible members or ropes 15 forming part of the elevating means. The present invention is not concerned with a particular type of elevator used on the hay loader and this may be of any well known or preferred type. The slats 13 on the elevator illustrated pass around the rods 8 on the reel and between the rows of teeth 9. The said teeth are adapted to lift the hay and place the same on the upper side of the conveyor formed by members 12 to 15.

In order that the hay may not again be carried downward around the reel, stripper members 16 are provided between which the teeth 9 are adapted to pass. Said stripper members comprise wires or rods extending about the reel formed of members 7 and 8 and fastened at their upper ends to a transversely extending bar 17 secured to the members 2. The members 16 are formed by bending a rod to form a bight or loop substantially at its central portion, which loops are secured in spaced relation to the top of bar 17 by suitable bolts 18. The sides of the rod diverge from the bolt 18 and then extend in substantially parallel relation over the top of and around the rods 8 of the reel. Said sides then diverge and have their ends extending through and secured in apertures 19 in the bar 17. The apertures 19 are substantially midway between the bolts 18 and each accommodates two of the ends of the members 16. The members 16 thus extend in spaced relation from the bar 16 about the reel and the teeth 9 pass substantially centrally between the same.

For the purpose of gathering the mown hay or other material, a plurality of comparatively long depending curved rake members 20 are provided which extend from a point above the top of the reel down around the rear of the same and are adapted to have their lower ends in engagement with the ground. The members 20 are mounted on a rod 21 extending transversely above the members 2, which rod has flat portions at its ends mounted in slots 22 formed in swinging members 23 which are disposed at each side of the frame and pivoted at their lower ends in angular lugs or brackets 24 bolted to the sides of the member 2. The ends of the rod 21 are held in the slots 22 by suitable cotter pins passing through the slot above the same. The members 20 are formed of resilient material such as spring steel and are formed in pairs. The piece of material forming a pair is provided with a pair of spaced coils 25 adjacent its center or middle portion which are connected by the middle portion of the piece, which portion is formed with a loop 26 of curved form extending substantially in alinement with the coils 25 through which loop a securing screw 27 is adapted to pass and engage in the rod 21. Each piece of material thus forms two of the members 20 and the loop 26 is movable on the screw 27 so that the members 20 have a certain amount of oscillating movement about the rod 21 which it will be understood passes through the coils 25. The members 23 are formed below the pivot and at the lower side thereof with a right angle base so as to seat against the bearing 24 and said members are urged to upright position by coiled springs 28 secured to the lower side of the members 23 and upstanding angle brackets 29 on the members 24. In order to swing the members 23 forwardly to raise the members 20 from contact with the ground the rod 21 has secured to its ends flexible members 30 which pass forwardly over small pulleys 31 secured to the sides of the frame and are adapted to wind about windlass members 32 mounted on the ends of a transverse rod or shaft 33 extending across the frame 1 and mounted in small brackets secured to the underside of members 2, which shaft is provided at one end with a suitable crank handle 34. The rod or shaft 33 will be provided with a suitable pawl and ratchet mechanism 35 by which it can be held in various positions. While the rod 21 may be made of any suitable material, it has been found in practice that a two inch pipe forms a simple and efficient piece of material for this member.

In the operation of the device, the handle 34 will be turned and the shaft 33 adjusted to allow the members 23 to be brought to their upstanding position, as illustrated in Fig. 2. The members 20 then swing down by gravity into contact with the ground, and as the machine is drawn across the field, the hay will be engaged by the members 20 and gathered into a roll or windrow ahead of said teeth. Each pair of said teeth are free to swing down independently so that if an obstruction is passed over, of small dimensions, only the teeth engaging therewith will be raised and the hay lying adjacent said obstruction will be gathered by the other teeth. Also, if a small depression in the ground is passed over, the teeth immediately thereover will drop down into such depression and any hay lying therein will be effectively gathered by the teeth. If the machine is drawn across a small ditch the teeth will, likewise, drop down into the same and gather the hay, even if the whole machine is not lowered. When the machine is used on the side of a hill or slanting ground the teeth 20 will also swing by gravity and engage uniformly along the ground so that the hay on such an inclined surface will be effectively gathered. The teeth 20, as stated, are preferably made of resilient metal and have considerable oscillatory movement about the rod 21 so that they can readily swing upwardly to pass over obstructions. The hay gathered in front of the members 20 will be engaged by the teeth 9 of the reel and carried upwardly thereon and passed onto the top of the conveyor by which it will be carried up onto the load. As the teeth 9 pass down between the stripper members 16, the hay will be effectively stripped from the teeth so that none of the hay will be carried around beneath the reel. When it is desired to transport the machine without using the same, the flexible members 30 will be wound on the windlasses 32 by turning the crank 34 and the members 23 thus swung downwardly and forwardly. This swinging movement will raise the lower ends of the members 20 above the ground so that they will not engage therewith objectionably as the machine is transported.

The device is designed to be used either on a hay loading device, as originally constructed or to form a device which may be applied to standard hay loaders. All of such hay loaders have wheels, axle and elevator thereon and in placing applicant's device on such a standard loader, the hay gathering device usually consisting of a rotatable toothed reel is removed, as is also the reel on the axle of the machine. The reel illustrated and described is then placed on the axle and the stripper 16 and members 20 with their attaching parts are then placed on the hay loading frame. By this change, the structure of most hay loaders is greatly simplified and the operation thereof improved.

From the above description it is seen that applicant has provided a simple and efficient hay loading device and one which will very efficiently gather hay and transfer the same to the loading elevator. The parts of the device are made from simple material easily procured and are assembled in strong and rugged structure. The parts are so constructed and arranged that there is practically no tendency for the same to become disarranged and get out of order and it is apparent that the structure will have great utility for the purpose intended.

It will, of course, be understood, that various changes may be made in the form, details and arrangement of the parts without departing from the scope of applicant's invention, which, generally stated, consists in the matter shown and described and set forth in the appended claims.

What is claimed is:

1. A hay loading machine having in combination, a frame, a wheel-carrying axle mounted therein, an elevator driven from said axle, a reel, comprising rows of teeth, secured on said axle and rotated thereby for delivering to said elevator, a bar disposed forwardly of said reel adjacent the upper side thereof, and stripper members comprising wires or rods secured in pairs to said bar, the wires or rods of each pair extending downwardly over the top of said reel in substantially parallel relation, around said reel and upwardly in diverging relation to said bar.

2. A hay loading device having in combination a frame, a wheel-carrying axle mounted therein, a reel on said axle and rotated thereby, comprising rows of spaced radial teeth, stripper members fixed above said reel and extending around the same, said stripper members each comprising a pair of spaced rods substantially parallel on the upper side of said reel and diverging at the lower side thereof, said radial teeth passing between said rods.

3. In a hayloading device comprising a reel having rows of spaced radial teeth, a series of stripper members, each comprising a wire or rod bent at its central portion to form parallel members, a bar above said reel to which the central portion is secured, said members extending down over the top of said reel in substantially parallel relation and extending in diverging relation around the lower side of the reel upwardly to said bar to which their ends are secured.

4. In a hay loading device having a reel comprising spaced radial teeth, a series of strippers extending between said teeth, each stripper member being formed as a wire or rod bent to form a loop at its central portion, a bar extending across and above said reel to which said loop is secured, said wire or rod having parallel side portions extending downwardly from said loop around said reel, said portions diverging and extending upwardly at the bottom portion of said reel and having their ends secured in said bar, said bar having apertures therethrough and the side portions of adjacent strippers extending through said apertures.

In testimony whereof I affix my signature.

MIKE HEGERLAND.